(12) United States Patent
Wang et al.

(10) Patent No.: US 9,002,591 B2
(45) Date of Patent: Apr. 7, 2015

(54) HARVESTER SPOUT CONTROL SYSTEM AND METHOD

(75) Inventors: Guoping Wang, Naperville, IL (US); John H. Posselius, Ephrata, PA (US); Keith W. Wendte, Willowbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 466 days.

(21) Appl. No.: 13/171,645

(22) Filed: Jun. 29, 2011

(65) Prior Publication Data

US 2012/0215409 A1 Aug. 23, 2012

Related U.S. Application Data

(60) Provisional application No. 61/444,526, filed on Feb. 18, 2011.

(51) Int. Cl.
*G06F 7/70* (2006.01)
*G06F 19/00* (2011.01)
*G06G 7/00* (2006.01)
*G06G 7/76* (2006.01)
*A01D 41/127* (2006.01)
*A01D 43/08* (2006.01)
*G05D 1/02* (2006.01)

(52) U.S. Cl.
CPC .......... *A01D 41/1278* (2013.01); *A01D 43/085* (2013.01); *G05D 1/0293* (2013.01); *G05D 1/0278* (2013.01); *G05D 2201/0201* (2013.01)

(58) Field of Classification Search
USPC .......................................................... 701/50
See application file for complete search history.

(56) References Cited

U.S. PATENT DOCUMENTS

| | | | |
|---|---|---|---|
| 4,529,348 A | 7/1985 | Johnson et al. | |
| 4,573,849 A | 3/1986 | Johnson et al. | |
| 5,167,581 A | 12/1992 | Haag | |
| 5,575,316 A | 11/1996 | Pollklas | |
| 5,749,783 A * | 5/1998 | Pollklas | 460/119 |
| 5,881,780 A | 3/1999 | Matye et al. | |
| 6,587,772 B2 * | 7/2003 | Behnke | 701/50 |
| 6,591,974 B2 | 7/2003 | Tofin et al. | |
| 6,682,416 B2 * | 1/2004 | Behnke et al. | 460/114 |
| 6,939,222 B2 | 9/2005 | Grossjohann et al. | |
| 6,943,824 B2 * | 9/2005 | Alexia et al. | 348/89 |
| 7,063,614 B2 | 6/2006 | Vogelgesang et al. | |
| 7,155,888 B2 * | 1/2007 | Diekhans | 56/10.2 R |
| 7,277,784 B2 * | 10/2007 | Weiss | 701/50 |
| 7,480,564 B2 * | 1/2009 | Metzler et al. | 701/469 |
| 7,537,519 B2 * | 5/2009 | Huster et al. | 460/114 |
| 8,260,499 B2 * | 9/2012 | Boydell | 701/42 |
| 2007/0037621 A1 | 2/2007 | Isfort | |
| 2008/0245042 A1 | 10/2008 | Brunnert et al. | |
| 2009/0044505 A1 * | 2/2009 | Huster et al. | 56/10.2 R |
| 2009/0099775 A1 | 4/2009 | Mott et al. | |
| 2009/0306835 A1 | 12/2009 | Ellermann et al. | |

* cited by examiner

*Primary Examiner* — Nicholas Kiswanto
(74) *Attorney, Agent, or Firm* — Rebecca L. Henkel

(57) ABSTRACT

A control system and method is provided for controlling the operational configuration of a spout of a harvester being used to perform unload on the go operations with an associated transport vehicle. The velocities of the harvester and transport vehicle and the lateral and longitudinal distances between the harvester and transport vehicle are used to predict future lateral and longitudinal distances between the harvester and transport vehicle. A control signal is issued to a harvester spout control system if either of the predicted lateral distance or longitudinal distance is outside of an associated acceptable range. The harvester spout control system then either shuts off the spout or changes the orientation of the spout in response to the control signal.

9 Claims, 4 Drawing Sheets

HARVESTER SPOUT CONTROL SYSTEM AND METHOD

CROSS-REFERENCE TO RELATED APPLICATIONS

This application claims the benefit of U.S. Provisional Application No. 61/444,526, entitled "SYSTEM AND METHOD FOR SYNCHRONIZED CONTROL OF A HARVESTER AND TRANSPORT VEHICLE," filed Feb. 18, 2011, which application is hereby incorporated by reference in its entirety.

BACKGROUND

The present application relates generally to a control system and method for a harvester spout. The present application relates more specifically to a control system and method to control the operation or position of the harvester spout during "unload on the go" operation of the harvester.

Harvesters or harvesting machines pick up crop material, treat the crop material, e.g., remove any undesirable portions or residue, and discharge the crop material. Harvesters can discharge the crop material, either continuously as with a forage harvester or after intermediate storage as with a combine harvester, to a transport or transfer vehicle. The transport vehicle may be a tractor or truck pulling a cart, wagon, or trailer, or a truck or other vehicle capable of transporting harvested crop material. The harvested crop material is loaded into the transport vehicle via a crop discharging or unloading device, such as a spout or discharge auger, associated with the harvester.

During "unload on the go" operation of the harvester, the harvested crop material is transferred from the harvester to the transport vehicle while both vehicles are moving. The transport vehicle can travel next to and/or behind the harvester during unload on the go operation. Unload on the go operation is required for a forage harvester, since the forage harvester constantly discharges the harvested crop material. While unload on the go operation is not required for a combine harvester due to the combine harvester's intermediate storage capability, unload on the go operation is commonly used for a combine harvester to maximize the operating efficiency of the combine harvester.

To effectively implement unload on the go operation, the operation of the harvester and transport vehicle is coordinated to maintain the relative distance between the harvester and transport vehicle within an acceptable range. By maintaining the relative distance of the harvester and transport vehicle within an acceptable range, the position and orientation of the harvester unload spout and the position of the transport vehicle, specifically the portion of the transport vehicle receiving crop material, relative to the harvester unload spout position are maintained within an acceptable distance range to permit harvester unload on the go operation, i.e., the discharged crop material can be provided into the transport vehicle without loss to the ground. That is, discharged crop material is directed to collect in the transport vehicle and is substantially prevented from being misdirected to miss the transport vehicle and collecting on the ground resulting in waste or loss of crop material. In order to maintain an acceptable distance range between the harvester and the transport vehicle, both the lateral (side to side) distance and longitudinal (fore and aft) distance between the harvester and transport vehicle have to be maintained within acceptable ranges.

Using a global positioning system (GPS) based auto-guidance system, auto-steering of the harvester and transport vehicle can maintain a lateral distance between the harvester and transport vehicle within an acceptable range. With a wireless communication link between the harvester and transport vehicle, each machine can communicate its corresponding position provided by the GPS system to the other machine. A master machine, such as a harvester, operates in a way to best perform the harvesting operation, while the slave machine, such as a transport vehicle, follows the GPS auto-guidance system's steering function to maintain an acceptable lateral distance from the master machine. Similarly, using a GPS based longitudinal distance control system, the longitudinal distance of the two machines can be controlled to be within an acceptable range during normal unload on the go operation.

However, the GPS based auto-guidance system may not be able to maintain an acceptable distance range between the harvester and the transport vehicle in the event of an unexpected field condition that results in a sudden speed change or position change of one or both of the harvester and transport vehicle. In other words, position synchronization between the harvester and transport vehicle can be broken by unexpected field conditions because the speed adjustment or position adjustment by the auto-guidance system may not occur quickly enough in order to prevent harvested crop material from dropping onto the ground. Some examples of unexpected field conditions that may occur during an unload on the go operation include obstacles, unexpected animals, stones, a furrow or washed out spot, a circle irrigation wheel rut, etc.

Therefore, what is needed is a system and method to prevent crop material loss to the ground caused by sudden vehicle speed changes or position changes during unload on the go operation.

SUMMARY

The present application is directed to a GPS based control system and method to prevent harvester crop material loss caused by sudden speed changes or position changes of either or both of the harvester or the transport vehicle during harvester unload on the go operations.

The present application relates to a method for controlling operation of an unload spout of a moving harvester used to supply crop material to an associated transport vehicle. The method includes predicting a lateral distance and a longitudinal distance between the harvester and the transport vehicle, determining if the predicted longitudinal distance is within a predetermined or acceptable longitudinal distance range, and determining if the predicted lateral distance is within a predetermined or acceptable lateral distance range. The method also includes transmitting a control signal to a harvester spout control system in response to at least one of the predicted longitudinal distance or the predicted lateral distance not being within the corresponding predetermined or acceptable lateral and longitudinal distance ranges and adjusting an operational configuration of the harvester spout from a first configuration in response to the transmission of the control signal to the harvester spout control system.

The present application further relates to a control system for a harvester spout. The control system includes a first global positioning system device to determine a position of a harvester and a second global positioning system device to determine a position of a transport vehicle. The control system further includes a first controller and a second controller. The first controller has a microprocessor to execute a computer program to calculate a harvester velocity, a transport vehicle velocity, a lateral distance between the harvester and the transport vehicle and a longitudinal distance between the harvester and the transport vehicle in response to receiving the position of the harvester from the first global positioning system device and the position of the transport vehicle from the second global positioning system device. The second controller has a microprocessor to execute a computer program to predict lateral and longitudinal distance changes and/or future lateral and longitudinal distances between the harvester and the transport vehicle over a time period of prediction, and determine whether the predicted lateral and longitudinal distances are within corresponding predetermined or acceptable lateral and longitudinal distance ranges in response to receiving the harvester velocity, the transport vehicle velocity, the lateral distance and the longitudinal distance from the first controller. The second controller transmits a control signal to adjust an operational configuration of the harvester spout with the microprocessor executing the computer program in response to at least one of the predicted lateral and longitudinal distance being outside of the corresponding predetermined or acceptable lateral and longitudinal distance ranges.

The second controller further predicts a distance deviation of the predicted lateral distance from a normal lateral distance and a distance deviation of the predicted longitudinal distance from a normal longitudinal distance. The normal lateral and longitudinal distances can be the lateral and longitudinal distances between the harvester and transport vehicle when the two vehicles are ideally aligned for unload on the go operation with the harvester spout at a zero-adjustment configuration and crop material is discharged to the center area of the loading receptacle. The magnitudes of the predicted lateral and longitudinal distance deviations can be used as a basis of how much and/or how fast to adjust an operational configuration of the harvester spout.

The present application additionally relates to a method for controlling operation of an unload spout of a moving harvester used to supply crop material to an associated transport vehicle. The method includes determining a velocity of a harvester, determining a velocity of an associated transport vehicle receiving crop material from the harvester, determining a first longitudinal distance between the harvester and the transport vehicle and determining a first lateral distance between the harvester and the transport vehicle. The method also includes predicting a second longitudinal distance between the harvester and the transport vehicle and predicting a second lateral distance between the harvester and the transport vehicle. The method further includes determining if the second longitudinal distance is within a predetermined or acceptable longitudinal distance range and determining if the second lateral distance is within an acceptable or predetermined lateral distance range. The method includes transmitting a control signal to a harvester spout control system in response to at least one of the second longitudinal distance or the second lateral distance not being within the corresponding range and adjusting an operational configuration of the harvester spout in response to the transmission of the control signal to the harvester spout control system.

One advantage of the present application is the ability to automatically adjust the harvester spout position and/or orientation to avoid crop material loss during unexpected field conditions.

Another advantage of the present application is the ability to automatically shut off the harvester spout to avoid crop material loss during unexpected field conditions.

Other features and advantages of the present application will be apparent from the following more detailed description of the exemplary embodiments, taken in conjunction with the accompanying drawings.

BRIEF DESCRIPTION OF THE FIGURES

Wherever possible, the same reference numbers will be used throughout the drawings to refer to the same or like parts.

DETAILED DESCRIPTION OF THE EXEMPLARY EMBODIMENTS

Figure 1:
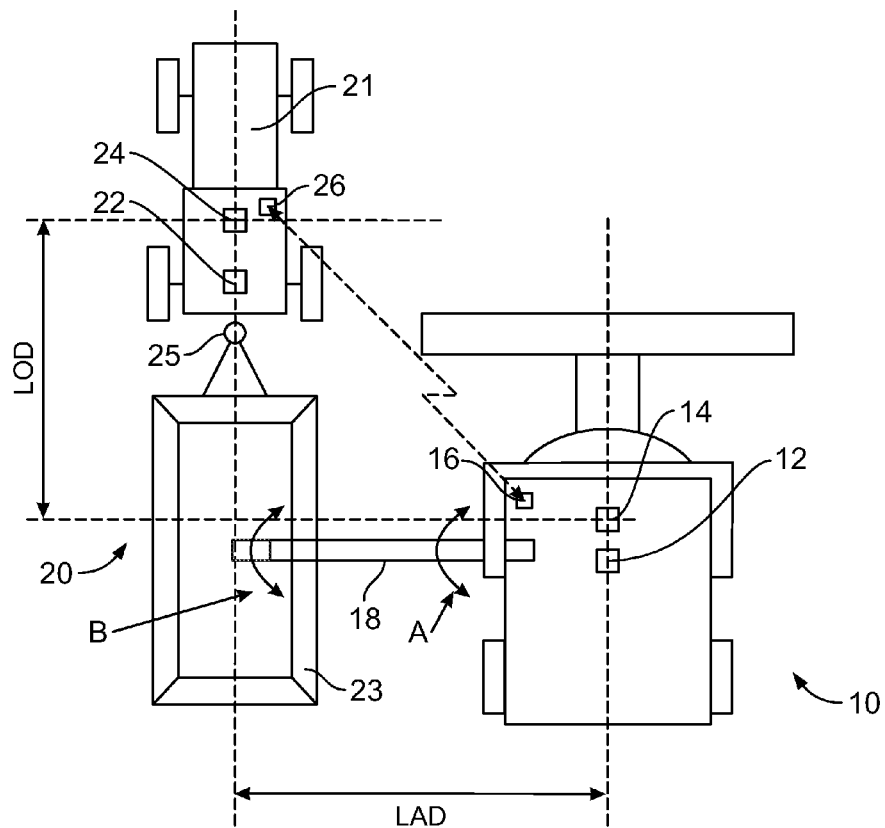
FIG. 1 shows a schematic top view of an embodiment of a combine and transport vehicle during unload on the go operation.
Figure 2:
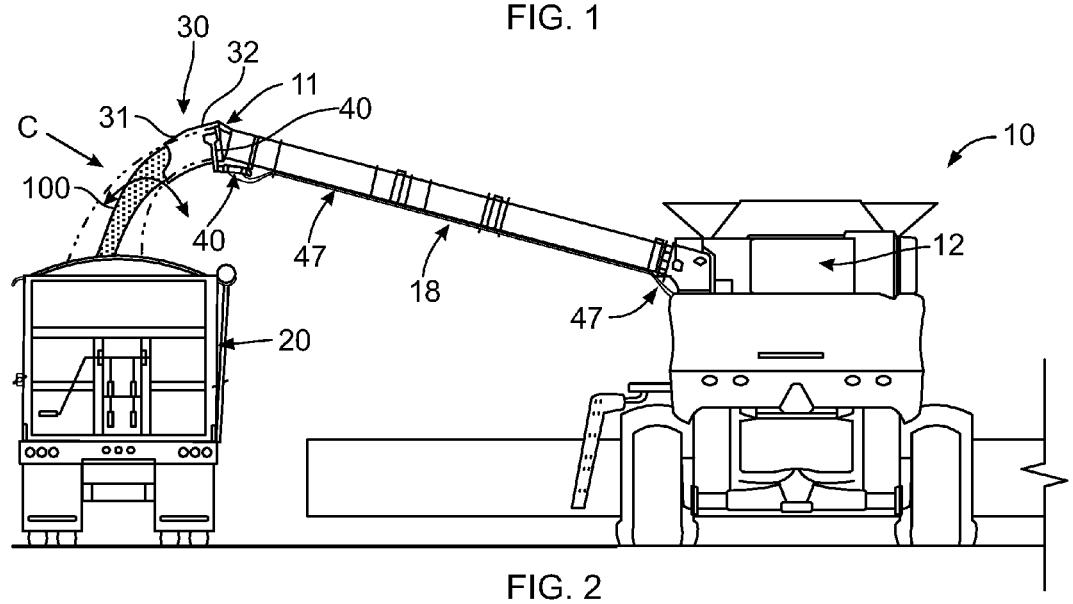
FIG. 2 shows a rear view of an embodiment of a combine and transport vehicle during unload on the go operation.

FIGS. 1 and 2 show the relative positions of a harvester 10 and transport vehicle 20 during an unload on the go operation. In one exemplary embodiment, the harvester 10 and the transport vehicle 20 can be controlled by a GPS based auto-guidance control system(s) in order to maintain a desired lateral distance (LAD) and a desired longitudinal distance (LOD) between the harvester 10 and the transport vehicle 20. The GPS based auto-guidance control system used in the exemplary embodiment can include a longitudinal distance control function which adjusts the speed of the transport vehicle 20 in following the harvester 10 to maintain a desired longitudinal distance (LOD). One exemplary embodiment of the reference points used for measuring the lateral distance and longitudinal distance is shown in FIG. 1. However, any suitable reference points for measuring lateral distance and longitudinal distance can be used. The desired lateral distance and desired longitudinal distance can both be preselected distances plus or minus a predetermined offset that ensures that crop material discharged from the harvester 10 is received and stored by the transport vehicle 20. The preselected lateral and longitudinal distances and the corresponding predetermined offsets can be related to the particular harvesters and transport vehicles being used, specifically the size of the storage area in the transport vehicle and an estimate of the shoot-out distance of the crop material from the harvester unload spout to the transport vehicle.

The desired lateral distance and desired longitudinal distance are control targets. During an unload on the go operation, the actual lateral and longitudinal distances are measured and compared to the corresponding desired lateral and longitudinal distances for calculating distance errors, and the control system(s) control the vehicles towards zero errors. In an exemplary embodiment, the desired lateral and longitudinal distances can gradually change around the normal lateral and longitudinal distances during unload on the go operation to provide a full or even filling of the loading receptacle of the transport vehicle. Otherwise, the desired lateral and longitudinal distances can be the same as the normal lateral and longitudinal distances.

The harvester 10 can have a controller 12, a GPS device 14 and a wireless communication device 16. Similarly, the transport vehicle 20 can have a controller 22, a GPS device 24 and a wireless communication device 26. The controller can be used to control operation of the harvester 10 and/or transport vehicle 20, regardless of which machine the controller may be installed on. The GPS device can be used to determine the position of the harvester 10 or the transport vehicle 20 and the wireless communication device can be used to send and receive information, data and control signals between the harvester 10 and the transport vehicle 20.

In the exemplary embodiment shown in FIG. 1, the transport vehicle 20 can include a traction device 21 and a loading receptacle 23. A hitch angle sensor 25 can be used to determine the relative angle or hitch angle between the traction device 21 and the loading receptacle 23. As shown in FIG. 1, the traction device 21 can be a tractor and the loading receptacle 23 can be a wagon. However, in other embodiments, the traction vehicle 21 may be a truck or other self-propelled vehicle sufficient to transport loading receptacle 23 and the loading receptacle 23 may be a grain cart, bin, or other similar storage/transport vehicle. In another embodiment, the transport vehicle 20 may be a truck, semi-trailer truck, tractor-trailer or other similar self-propelled container vehicle.

Referring now to FIG. 2, the combine harvester 10 has an unloading tube or spout 18 transversely extending and fully deployed as it unloads crop material 100 through the discharge boot 30 and into the transport vehicle 20. The boot 30 can have any convenient and suitable shape. In one exemplary embodiment, the boot 30 can be generally cylindrical, but can be more boxy with edges, or venturi-shaped, etc. The opening of the unloading tube or spout 18 at its distal end is peripherally sealed by a joint member 11 which hingedly engages portion 32 of the boot 30, which portion 32 interfaces the distal end of the unloading tube or spout 18. The joint member 11 can be rounded or spherical, but can also be cylindrical on a horizontal axis, so long as the interface between the tube or spout 18 and the boot 30 is adequately sealed. Angularly extending from portion 32 of the boot 30 is a spout end 31. Signals from the controller 12 of combine harvester 10, travel through conduits 47 for controlling the actuators 40, which actuators 40 can pivotally move the boot 30 up and down and back and forth in hinging relationship to the unloading tube or spout 18, via spherical joint 11. The joint 11 also serves to seal the interface at end 32 of the boot 30.

The controllers 12, 22 can include a microprocessor, a non-volatile memory, an interface board, an analog to digital (A/D) converter, and a digital to analog (D/A) converter to control operation of the harvester 10, transport vehicle 20 and harvester spout control. The controllers 12, 22 can execute one or more control algorithms to control operation, guidance and/or steering of the harvester 10 and/or transport vehicle 20, to control the speed of the transport vehicle 20, and to implement harvester spout control. In one embodiment, the control algorithm(s) can be computer programs or software stored in the non-volatile memory of the controllers 12, 22 and can include a series of instructions executable by the corresponding microprocessor of the controllers 12, 22. While it is preferred that the control algorithm be embodied in a computer program(s) and executed by the microprocessor, it is to be understood that the control algorithm may be implemented and executed using digital and/or analog hardware by those skilled in the art. If hardware is used to execute the control algorithm, the corresponding configuration of the controllers 12, 22 can be changed to incorporate the necessary components and to remove any components that may no longer be required.

Further, the controllers 12, 22 can be connected to or incorporate a user interface that permits an operator of the harvester 10 or transport vehicle 20 to interact with the controllers 12, 22. The operator can select and enter commands for the controllers 12, 22 through the user interface. In addition, the user interface can display messages and information from the controllers 12, 22 regarding the operational status of harvester 10 and/or transport vehicle 20. The user interfaces can be located locally to the controllers 12, 22, or alternatively, the user interfaces can be located remotely from the controllers 12, 22.

Figure 3:
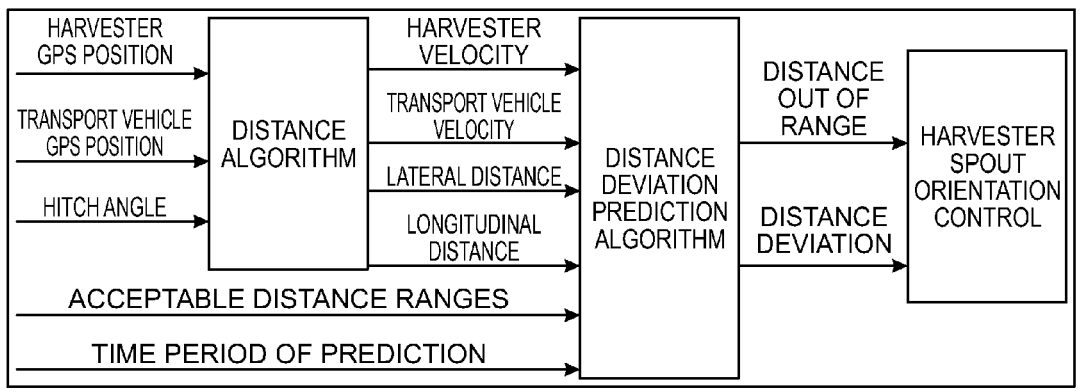
FIG. 3 shows schematically an embodiment of a control system for harvester unload spout orientation control during unload on the go operation.
Figure 6:
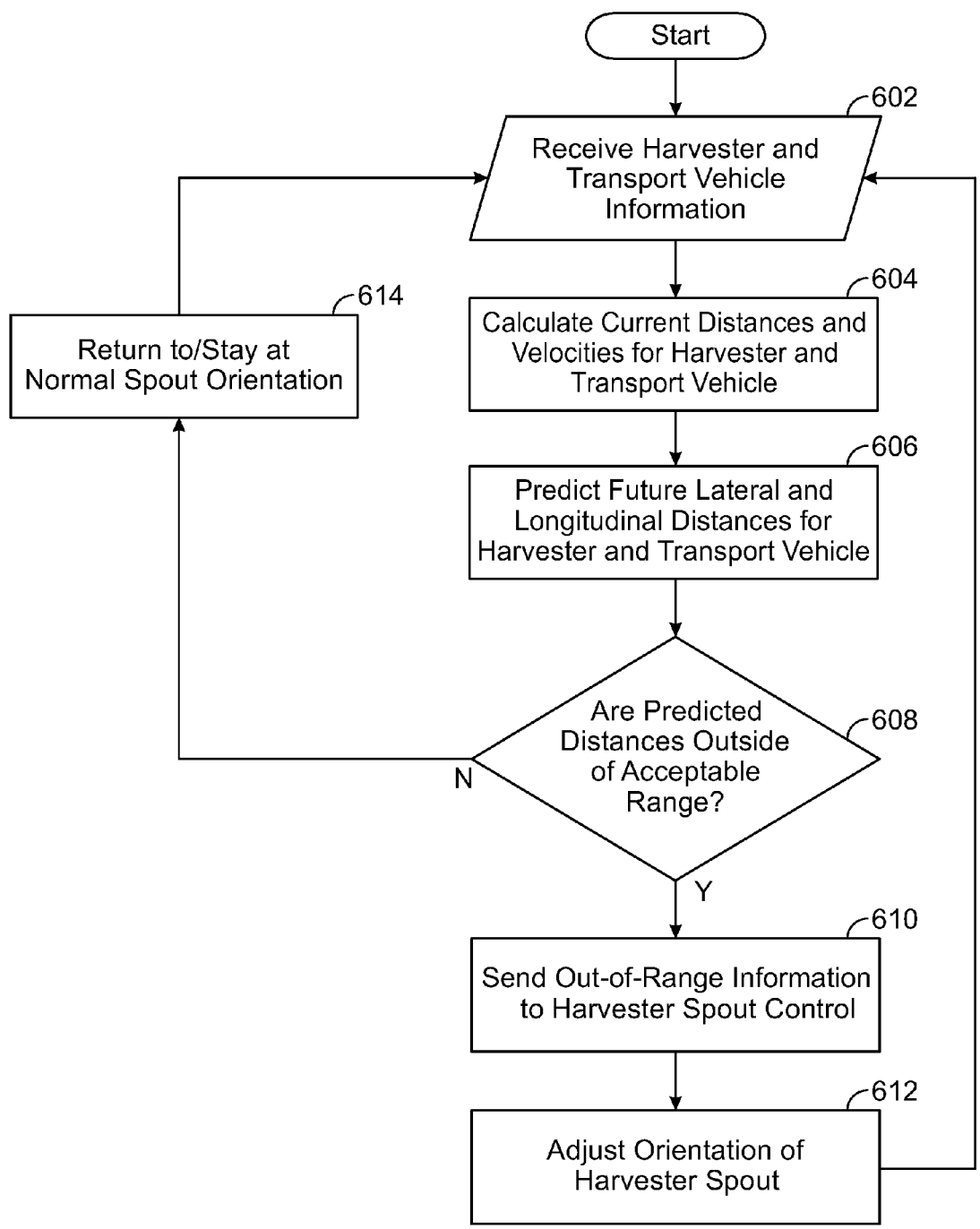
FIG. 6 shows a flow chart of an embodiment of a control process for the control system of FIG. 3.

FIGS. 3 and 6 show a control system and method for harvester spout orientation control during unload on the go operations. The control system and method can be implemented either on the harvester controller 12 or on the transport vehicle controller 22 because of the wireless communications between the harvester 10 and transport vehicle 20. A harvester GPS position, a transport vehicle GPS position and the hitch angle of the transport vehicle (if applicable) are provided (step 602) to a distance algorithm or controller in the corresponding controller 12 or 22. The distance algorithm or controller can then calculate a harvester velocity, a transport vehicle velocity, a current lateral distance between the harvester 10 and transport vehicle 20 and a current longitudinal distance between the harvester 10 and transport vehicle 20 (step 604). The corresponding controller then executes a distance deviation prediction algorithm or controller using the calculated harvester velocity, the transport vehicle velocity, the current lateral distance and the current longitudinal distance to predict future lateral and longitudinal distances and their distance deviations from the corresponding normal lateral distance and normal longitudinal distance (step 606) caused by sudden machine speed changes or other machine conditions or operations over a predetermined time period of prediction. The distance deviation prediction algorithm then compares the predicted lateral and longitudinal distances to the acceptable longitudinal distance range and the acceptable lateral distance range (step 608). If the distance deviation prediction algorithm predicts that the longitudinal distance and/or lateral distance between the harvester unload spout and the transport vehicle may go out of the acceptable distance ranges in the time period of prediction, the algorithm sends out the distance out of range signal together with the predicted distance deviations (step 610) to a harvester spout orientation control system or controller. The harvester spout orientation control system receives the distance out of range signal and the predicted distance deviations and controls the spout orientation accordingly to prevent a loss of crop material to the ground (step 612). Otherwise, the predicted longitudinal distance and lateral distance are within the acceptable distance ranges. The harvester spout orientation control system controls the spout to return to or stay at its normal orientation (step 614), that is, its zero adjustment orientation. The process begins again (step 602) at the next time step to determine if the harvester and transport vehicle are within acceptable ranges.

FIG. 6 shows a flow chart of an embodiment of a control process for the case where the harvester spout orientation control system or controller is implemented by the harvester controller 12 which also implements the distance algorithm and the distance deviation prediction algorithm. Alternatively in another embodiment, the harvester spout orientation control system or controller can be implemented by an additional controller unit.

The normal lateral distance and normal longitudinal distance are the lateral and longitudinal distances between the harvester and the transport vehicle when the two vehicles are aligned so that the loading receptacle 23 receives crop material at its center area and the harvester spout is at its zero-adjustment configuration.

The time period of prediction relates to the response time of the harvester spout control, and the value of the time period is dependent on how fast the harvester spout control system responds to a spout orientation control command signal or a spout shut-off command signal. The value of the time period of prediction is preset before an activation of unload on the go operation, and can be preset to, but not limited to, be slightly greater than the spout control response time. Before an unload on the go operation is activated, the value of the time period of prediction is set when an operator selects a harvester model on a user interface. The preset value is then sent from the user interface unit to the controller 12 and/or controller 22 before an unload on the go activation.

The acceptable distance ranges, that is, the acceptable lateral distance range and acceptable longitudinal distance range, relate to the dimensions of the harvester and its spout, dimensions of the transport vehicle and its storage area, and GPS antenna installation locations on the harvester and transport vehicle. The values of acceptable distance ranges are predetermined before an activation of unload on the go operation. Before an unload on the go operation is activated, the values of acceptable lateral distance range and acceptable longitudinal distance range are set when an operator selects a harvester model and a transport vehicle model with the dimensions of the storage area on the user interface. Those preset values are then sent from the user interface unit to the controller 12 and/or controller 22 before an unload on the go activation.

In another embodiment, the distance deviation prediction algorithm or controller receives information of harvester velocity and/or transport vehicle velocity from the corresponding harvester GPS device 14 and/or the transport vehicle GPS device 24, without using the harvester velocity and transport vehicle velocity calculated by the distance algorithm.

The harvester spout control system can include the harvester spout orientation control system and one or more sensors to determine or measure the position of the spout, e.g., rotational position, and the position of the boot, e.g., fore and aft rotational position and/or lateral position. Using the known position of the spout and boot and the predicted distance deviations, the harvester spout control system can adjust the position or change the orientation of the spout and boot in response to receiving the distance out of range signal. The harvester spout control system can rotate the entire spout in either direction as shown by arrow A in FIG. 1. The harvester spout control system can also adjust the boot to redirect the crop material flow either rearward or forward, i.e., longitudinally, in the transport vehicle as shown by arrow B in FIG. 1. The harvester spout control system can further adjust the boot to redirect the crop material flow to be ejected either farther or closer, i.e., laterally, in the transport vehicle as shown by arrow C in FIG. 2.

The particular adjustment to the spout and boot made by the harvester spout control system is dependent on the information received with the out of range signal. For example, if an unacceptable lateral distance deviation is to occur based on the out of range signal, the harvester spout control may adjust the lateral ejection distance of the spout and boot. In another example, if an unacceptable longitudinal distance deviation is to occur based on the out of range signal, the harvester spout control may adjust one or both of the rotational or longitudinal positions of the spout and boot depending on the amount of deviation.

Figure 4:
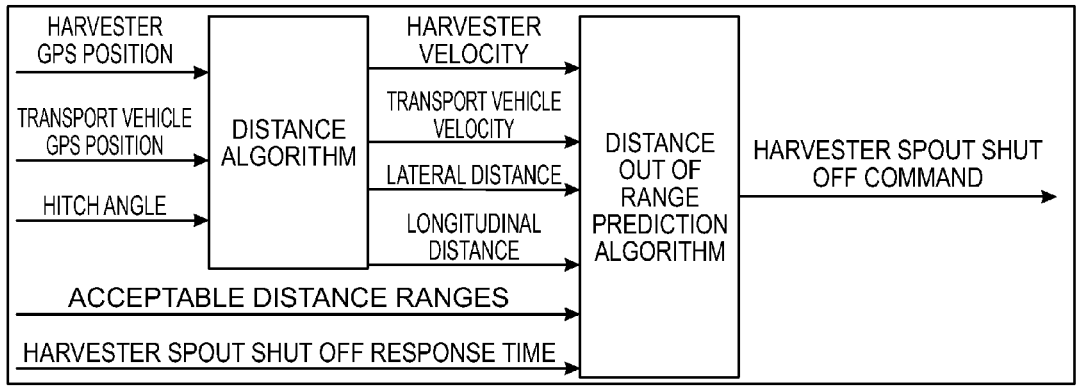
FIG. 4 shows schematically an embodiment of a control system for harvester unload spout emergency shutoff control during unload on the go operation.
Figure 7:
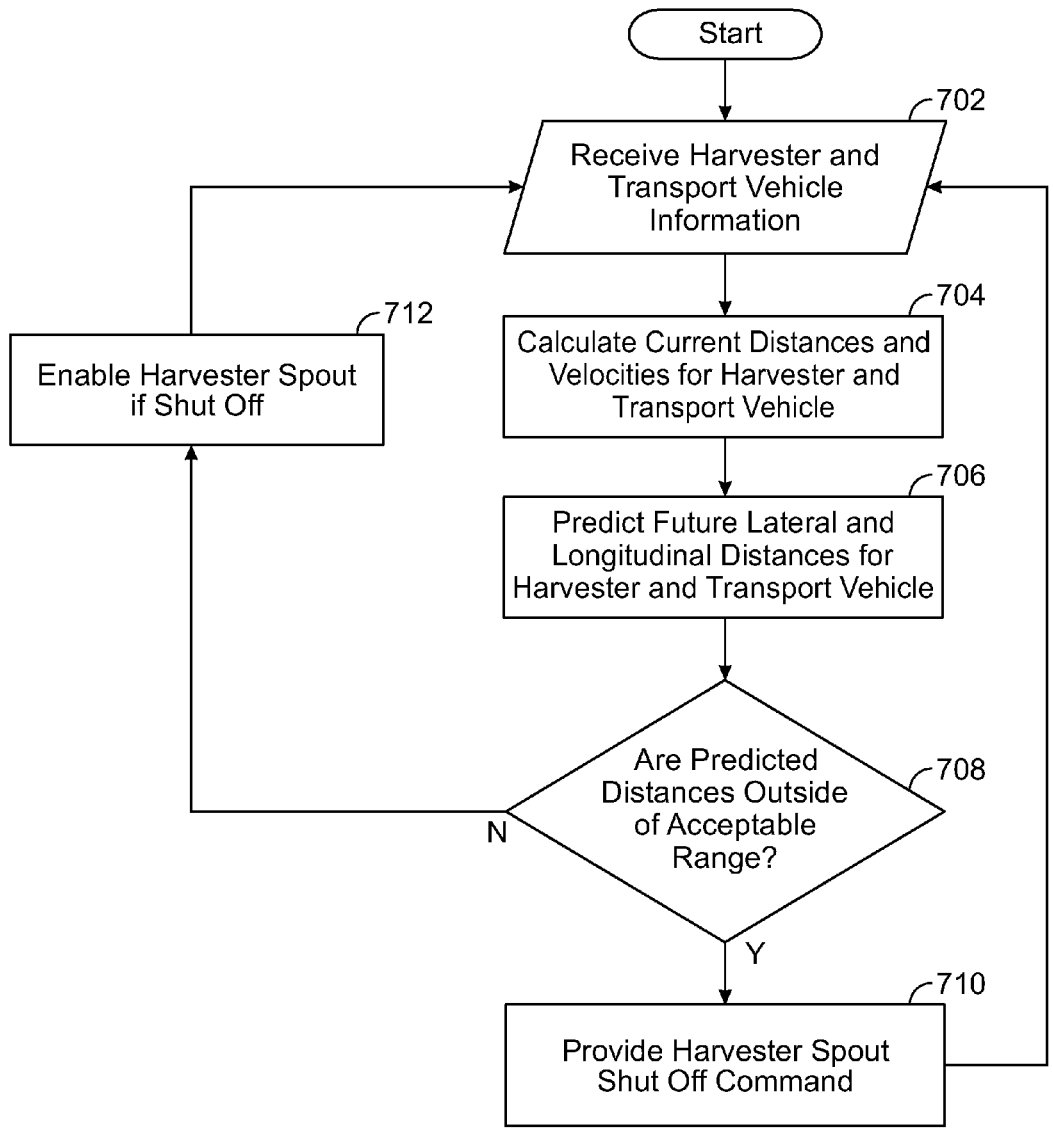
FIG. 7 shows a flow chart of an embodiment of a control process for the control system of FIG. 4.

FIGS. 4 and 7 show a control system and method for emergency harvester spout shut off during unload on the go operations. The control system and method can be implemented either on the harvester controller 12 or on the transport vehicle controller 22 because of the wireless communications between the harvester 10 and transport vehicle 20. A harvester GPS position, a transport vehicle GPS position and a hitch angle of the transport vehicle (if applicable) are provided (step 702) to a distance algorithm or controller in the corresponding controller 12 or 22. The distance algorithm or controller can then calculate a harvester velocity, a transport vehicle velocity, a current lateral distance between the harvester 10 and transport vehicle 20 and a current longitudinal distance between the harvester 10 and transport vehicle 20 (step 704). The corresponding controller then executes a distance out of range prediction algorithm or controller using the harvester velocity, the transport vehicle velocity, the current lateral distance and the current longitudinal distance to predict future lateral and longitudinal distances and their deviations from corresponding normal lateral distance and normal longitudinal distance (step 706) caused by sudden machine speed changes or other machine conditions or operations over a harvester spout shut off response time. The distance out of range prediction algorithm then compares the predicted lateral and longitudinal distances to the acceptable longitudinal distance range and the acceptable lateral distance range (step 708).

If the distance out of range prediction algorithm predicts that the longitudinal distance and/or lateral distance between the harvester unload spout and the transport vehicle may go out of the acceptable distance ranges in the harvester spout shut off response time, i.e., the response time from when a shut off command is issued until the unload auger is actually shut off, the algorithm sends out a harvester spout shut off command signal (step 710) to a harvester spout control system or the harvester control system. The harvester spout control system (not shown in FIG. 4) receives the shut off command and stops operation of the harvester spout until the longitudinal distance deviation and/or lateral distance deviation are within the acceptable distance ranges. The process begins again (step 702) at the next time step to determine if the harvester and transport vehicle are within acceptable ranges.

However, if the distance out of range prediction algorithm predicts that the longitudinal distance and/or lateral distance between the harvester unload spout and the transport vehicle are within the acceptable distance ranges, the algorithm sends out a harvester spout enable or start command (step 712) to a harvester spout control system or the harvester control system to begin harvester spout operation if spout operation was stopped or to continue with harvester spout operation.

Figure 5:
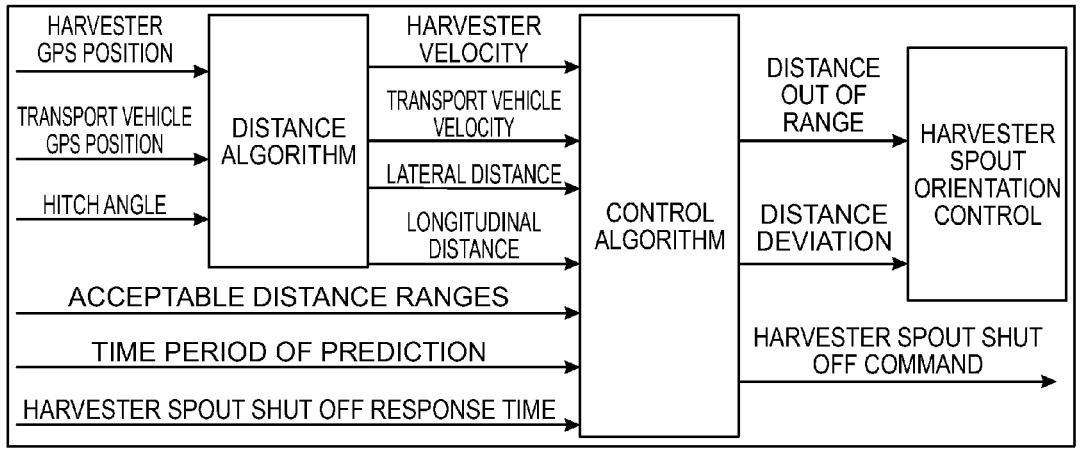
FIG. 5 shows schematically an embodiment of a control system for harvester unload spout orientation control and harvester unload spout emergency shutoff control during unload on the go operation.

FIG. 5 shows a control system for both emergency harvester spout shut off and harvester spout orientation control during unload on the go operations. The control system can be implemented either on the harvester controller 12 or on the transport vehicle controller 22 because of the wireless communications between the harvester 10 and transport vehicle 20. A harvester GPS position, a transport vehicle GPS position and the hitch angle of the transport vehicle (if applicable) are provided to a distance algorithm in the controller. The distance algorithm can then calculate a harvester velocity, a transport vehicle velocity, a current lateral distance between the harvester 10 and transport vehicle 20 and a current longitudinal distance between the harvester 10 and transport vehicle 20.

A control algorithm uses the harvester velocity, the transport vehicle velocity, the current lateral distance and the current longitudinal distance from the distance algorithm to predict future lateral and longitudinal distances and their distance deviations from the normal lateral and longitudinal distances caused by sudden machine speed changes or other machine conditions or operations. The control algorithm then compares the predicted lateral and longitudinal distances to the acceptable longitudinal distance range and the acceptable lateral distance range.

If the control algorithm predicts that the longitudinal distance and/or lateral distance between the harvester unload spout and the transport vehicle may go out of the acceptable distance ranges in the time period of prediction, the algorithm sends out the distance out of range signal together with the predicted distance deviations to a harvester spout control system. The harvester spout control system receives the distance out of range signal and the predicted distance deviations and controls spout orientation accordingly to prevent a loss of crop material to the ground.

Alternatively, if the control algorithm predicts that the longitudinal distance and/or lateral distance between the harvester unload spout and the transport vehicle may go out of the acceptable distance ranges in the harvester spout shut off response time, i.e., the response time from when a shut off command is issued until the unload auger is actually shut off, the algorithm sends out a harvester spout shut off command to a harvester spout control system or the harvester control system. The harvester spout control system receives the shut off command and stops operation of the harvester spout until the longitudinal distance and/or lateral distance are within the acceptable distance ranges. In one embodiment, the particular control commands or signals provided by the control algorithm can be dependent on the magnitude of the deviation from the acceptable lateral and longitudinal distance ranges. In another embodiment, the harvester spout control system can determine whether to adjust orientation of the spout or shut off the spout based on the control commands and signals provided by the control algorithm.

It should be understood that the application is not limited to the details or methodology set forth in the following description or illustrated in the figures. It should also be understood that the phraseology and terminology employed herein is for the purpose of description only and should not be regarded as limiting.

The present application contemplates methods, systems and program products on any machine-readable media for accomplishing its operations. The embodiments of the present application may be implemented using existing computer processors, or by a special purpose computer processor for an appropriate system, or by a hardwired system.

Embodiments within the scope of the present application include program products comprising machine-readable media for carrying or having machine-executable instructions or data structures stored thereon. Machine-readable media can be any available non-transitory media that can be accessed by a general purpose or special purpose computer or other machine with a processor. By way of example, machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Likewise, software implementations could be accomplished with standard programming techniques with rule based logic and other logic to accomplish the various connection steps, processing steps, comparison steps and decision steps.

In further consideration of the drawings of this application and the discussion of such drawings and the elements shown therein, it should also be understood and appreciated that, for purposes of clarity in the drawings, pluralities of generally like elements positioned near to one another or extending along some distance may sometimes, if not often, be depicted as one or more representative elements with extended phantom lines indicating the general extent of such like elements. In such instances, the various elements so represented may generally be considered to be generally like the representative element depicted and generally operable in a like manner and for a like purpose as the representative element depicted.

Many of the fastening or connection processes and components utilized in the application are widely known and used, and their exact nature or type is not necessary for an understanding of the application by a person skilled in the art. Also, any reference herein to the terms "left" or "right" is used as a matter of mere convenience, and is determined by standing at the rear of the machine facing in its normal direction of travel. Furthermore, the various components shown or described herein for any specific embodiment in the application can be varied or altered as anticipated by the application and the practice of a specific embodiment of any element may already by widely known or used by persons skilled in the art.

It will be understood that changes in the details, materials, steps and arrangements of parts which have been described and illustrated to explain the nature of the application will occur to and may be made by those skilled in the art upon a reading of this disclosure within the principles and scope of the application. The foregoing description illustrates an exemplary embodiment of the invention; however, concepts, as based upon the description, may be employed in other embodiments without departing from the scope of the application.

While the application has been described with reference to an exemplary embodiment, it will be understood by those skilled in the art that various changes may be made and equivalents may be substituted for elements thereof without departing from the scope of the application. In addition, many modifications may be made to adapt a particular situation or material to the teachings of the application without departing from the essential scope thereof. Therefore, it is intended that the application not be limited to the particular embodiment disclosed as the best mode contemplated for carrying out this application, but that the invention will include all embodiments falling within the scope of the appended claims.

What is claimed is:

1. A method for controlling operation of an unload spout of a moving harvester used to supply a crop material to transport vehicle, the method comprising:

predicting a predicted lateral distance and a predicted longitudinal distance between the moving harvester and the transport vehicle;

determining if the predicted longitudinal distance is within a predetermined longitudinal distance range;

determining if the predicted lateral distance is within a predetermined lateral distance range;

transmitting a control signal to a harvester spout control system in response to at least one of the predicted longitudinal distance or the predicted lateral distance not being within the corresponding predetermined lateral and longitudinal distance ranges;

adjusting an operational configuration of a harvester spout from a first configuration in response to the transmission of the control signal to the harvester spout control system;

determining a velocity of the harvester;

determining a velocity of the transport vehicle receiving crop material from the harvester;

determining an actual longitudinal distance between the harvester and the transport vehicle;

determining an actual lateral distance between the harvester and the transport vehicle;

determining a harvester spout control response time predicting a predicted longitudinal distance deviation from a normal longitudinal distance based on the harvester spout control response time, the velocity of the harvester and the velocity of the transport vehicle; and predicting a predicted lateral distance deviation from a normal lateral distance based on the harvester spout control response time, the velocity of the harvester and the velocity of the transport vehicle.

2. The method of claim 1 further comprising repeating predicting a predicted lateral distance and a predicted longitudinal distance, determining if the predicted longitudinal distance is within a predetermined longitudinal distance range and determining if the predicted lateral distance is within a predetermined lateral distance range after adjusting an operational configuration of the harvester spout.

3. The method of claim 2 further comprising:

transmitting a control signal to the harvester spout control system in order to return the operational configuration of the harvester spout to the first configuration; and returning the operational configuration of the harvester spout to the first configuration in response to the predicted longitudinal distance and the predicted lateral distance being within corresponding predetermined lateral and longitudinal distance ranges.

4. The method of claim 1 wherein adjusting an operational configuration of the harvester spout comprises stopping operation of the harvester spout.

5. The method of claim 1 wherein adjusting an operational configuration of the harvester spout comprises adjusting an orientation of the harvester spout.

6. The method of claim 5 wherein adjusting an orientation of the harvester spout comprises rotating the harvester spout.

7. The method of claim 5 wherein adjusting an orientation of the harvester spout comprises adjusting one of a rotational position or a lateral position of a boot connected to the harvester spout.

8. The method of claim 1 wherein adjusting an operational configuration of the harvester spout comprises measuring a measured position of the harvester spout and adjusting an orientation of the harvester spout based on at least one of the measured position of the harvester spout, the distance out of range signal, the predicted longitudinal distance deviation or the predicted lateral distance deviation.

9. The method of claim 1, wherein transmitting a control signal to a harvester spout control system comprises transmitting the predicted longitudinal distance deviation, the predicted lateral distance deviation and a distance out of range signal to the harvester spout control system.

* * * * *